(12) United States Patent
Buehl et al.

(10) Patent No.: US 9,434,239 B2
(45) Date of Patent: Sep. 6, 2016

(54) REAR WINDOW ROLLER BLIND SYSTEM

(71) Applicants: Olaf Buehl, Albershausen (DE); Harry Weinbrenner, Oberboihingen (DE)

(72) Inventors: Olaf Buehl, Albershausen (DE); Harry Weinbrenner, Oberboihingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/363,526

(22) PCT Filed: Dec. 3, 2012

(86) PCT No.: PCT/EP2012/074226
§ 371 (c)(1),
(2) Date: Jun. 6, 2014

(87) PCT Pub. No.: WO2013/083515
PCT Pub. Date: Jun. 13, 2013

(65) Prior Publication Data
US 2014/0345813 A1  Nov. 27, 2014

(30) Foreign Application Priority Data

Dec. 9, 2011  (DE) .................. 10 2011 088 183

(51) Int. Cl.
*B60J 1/20* (2006.01)
*B60J 1/18* (2006.01)
(Continued)

(52) U.S. Cl.
CPC ............... *B60J 1/18* (2013.01); *B29C 51/264* (2013.01); *B29C 51/266* (2013.01); *B60J 1/208* (2013.01); *B60J 1/2038* (2013.01); *B60J 1/2063* (2013.01); *B29L 2031/719* (2013.01)

(58) Field of Classification Search
CPC .......................... B60J 1/2019; B60J 1/2063
USPC ..................... 296/97.8, 97.9, 97.1
See application file for complete search history.

(56) References Cited

U.S. PATENT DOCUMENTS 5,067,546 A    11/1991  Jeuffray et al.
6,598,929 B2 *  7/2003  Schlecht ............... B60J 1/2027
                                                  160/265

(Continued)

FOREIGN PATENT DOCUMENTS

CN          1935547 A    3/2007
CN        201922895 U    8/2011
(Continued)

OTHER PUBLICATIONS

International Search Report issued in PCT/EP2012/074226 dated Jan. 14, 2013 with English translation (4 pages).
(Continued)

*Primary Examiner* — H Gutman
(74) *Attorney, Agent, or Firm* — Flynn, Thiel, Boutell & Tanis, P.C.

(57) ABSTRACT

A roller blind system for a rear window of a motor vehicle, having a roller blind, a roller blind shaft rotatable about a main axis and a sheet-like structure which, in a stowed state, is wound on the roller blind shaft and which, in a functional state, is partially unwound from the roller blind shaft, and having an shelf for arranging in the rear region of the motor vehicle. The shelf has front and rear shelf portions separated from one another by a passage slot through which the sheet-like structure is moved during a movement from the stowed state into the functional state. The two shelf portions are connected to one another via a trough body and the roller blind shaft is arranged within the trough body and is rotatably mounted by bearing blocks which are fastened to, or are an integral part of, the trough body.

11 Claims, 4 Drawing Sheets

(51) Int. Cl.
*B29C 51/26* (2006.01)
*B29L 31/00* (2006.01)

(56) References Cited

U.S. PATENT DOCUMENTS

| | | | |
|---|---|---|---|
| 6,796,599 B2 | 9/2004 | Schlecht et al. | |
| 7,316,443 B2 * | 1/2008 | Schlecht | B60J 1/2027 160/370.22 |
| 7,396,067 B2 * | 7/2008 | Thumm | B60J 1/2027 160/270 |
| 7,942,463 B2 | 5/2011 | Starzmann et al. | |
| 8,397,788 B2 | 3/2013 | Weinbrenner et al. | |
| 2004/0012225 A1 | 1/2004 | Schlecht et al. | |
| 2007/0095489 A1 | 5/2007 | Thumm et al. | |
| 2008/0289776 A1 | 11/2008 | Starzmann et al. | |
| 2009/0050278 A1 | 2/2009 | Weinbrenner et al. | |

FOREIGN PATENT DOCUMENTS

| | | | |
|---|---|---|---|
| DE | 102 28 028 B3 | | 2/2004 |
| DE | 10231626 A1 | * | 2/2004 |
| DE | 10 2007 023 810 A1 | | 11/2008 |
| DE | 10 2007 039 255 A1 | | 2/2009 |
| DE | 102012213210 A1 | * | 3/2013 |
| EP | 0 394 123 A1 | | 10/1990 |
| EP | 0 424 327 A2 | | 4/1991 |
| EP | 0 926 007 A1 | | 6/1999 |
| EP | 1 099 579 A1 | | 5/2001 |
| FR | 2851200 A1 | * | 8/2004 |
| JP | 03-140588 A | | 6/1991 |
| JP | 2007-126143 A | | 5/2007 |
| JP | 2010-201956 A | | 9/2010 |

OTHER PUBLICATIONS

German Examination Report issued in Appln. DE 10 2011 088 183.2 dated Jun. 29, 2012 (8 pages).
English translation of the First Office Action of the Chinese Patent Office issued in Application No. 201280060801.6, date issued Nov. 10, 2015 (11 pages).
Office Action of Japan Patent Office issued in Application No. 2014-545198 with English translation date of mailing Apr. 26, 2016 (7 pages).

* cited by examiner

REAR WINDOW ROLLER BLIND SYSTEM

FIELD OF APPLICATION AND PRIOR ART

The invention relates to a roller blind system for covering a rear window of a motor vehicle having a roller blind, comprising a roller blind shaft which can be rotated about a main axis and a flexible surface structure which is wound on the roller blind shaft in a storage state and which is at least partially unwound from the roller blind shaft in an operating state, and having a planar shelf which is intended to be arranged in the rear region of the motor vehicle and which comprises a front and a rear shelf portion, which each form a part-portion of the shelf and which are separated from each other by means of a through-slot through which the surface structure is moved during transfer from the storage state into the operating state.

Roller blind systems of the generic type are generally known from the prior art. The roller blind which these roller blind systems comprise conventionally has a roller blind shaft and a surface structure which can be wound thereon. In this instance, there is provision in roller blind systems of the generic type for this roller blind, at least the roller shaft thereof, to be arranged below a planar shelf in the vehicle. In most cases, this is a parcel shelf. This shelf comprises a front and a rear shelf portion which are separated from each other by means of a through-slot through which the surface structure can be introduced into the inner space of the vehicle in order to cover the rear window.

The through-slot mentioned consequently forces the shelf to be divided into two, which often makes it necessary to handle the shelf portions separately during the assembly of the vehicle. Depending on the configuration of the roller blind, the shelf portions may be completely separated from each other. This is the case when the through-slot has to extend at both sides as far as the edge of the shelf as a result of the type of roller blind. This is the case, for example, with roller blinds in which lateral edges of the surface structure are intended to be introduced in accordance with provisions in guide rails which extend along the C pillar of the vehicle. In other configurations, it is sufficient for the slot to take up the majority of the width of the shelf. However, the problem also exists here that the two shelf portions which are consequently connected to each other only in the region of narrow webs are movable relative to each other and consequently make assembly more difficult.

At least from the internal prior art of the Applicant, it is already known that the roller blind is retained below the shelf by means of three approximately U-shaped clasps which are secured at both sides to the shelf portions and consequently stabilize them with respect to each other. However, this connection of the clasps to the shelf portions is not of a sufficiently rigid type for the shelf to be able to be handled as a common structural unit during assembly.

It has also been a problem up to the present time with existing configurations that the through-slot between the shelf portions also allows noise to penetrate into the passenger space. This relates, on the one hand, to the noise generated directly by the roller blind, for example, the noise of an electric motor for moving the roller blind. However, it also relates to the noise which is generated by other vehicle components in the rear region of a vehicle and which can reach as far as a region below the parcel shelf and from there can reach the passenger inner space through the though-slot.

PROBLEM AND SOLUTION

An object of the invention is to develop a roller blind system of the generic type in such a manner that it ensures a particularly simple ability to be assembled. An object of the invention is also further to optimize a generic roller blind system with respect to low noise pollution for vehicle occupants.

The object is achieved according to the invention in that the two shelf portions are connected to each other by means of a vessel member of the roller blind system and in that the roller blind shaft is arranged inside the vessel member and is rotatably supported by means of bearing blocks which are also secured to the vessel member or are an integral component of the vessel member.

According to the invention, it is accordingly proposed that the roller blind system be connected to both shelf portions at both sides of the through-slot. This general connection which is already known at least from the internal prior art is carried out according to the invention by means of direct use of the vessel member, which is secured at both sides to the shelf portions. In this instance, the vessel member is fitted directly to the shelf portions, this direct nature being intended to be understood to mean that there are no intermediate components at all with the exception of securing means in accordance with provisions, such as screws, nuts and rivets and the like, provided between the shelf portions or connection devices which are securely connected thereto and the vessel member. The vessel member is a component which cannot be disassembled without the use of tools and preferably not even without being destroyed, which will be explained in greater detail below. This vessel member further performs the function that the support of the roller blind shaft is carried out either directly on the vessel member or by means of bearing blocks which are connected to the vessel member. Consequently, the vessel member is not a simple cover which is drawn over a roller blind of a roller blind system, which roller blind is also capable of operation without a cover, but instead is the significant structural component of the roller blind system. The shelf itself is a substantially planar and normally two-part component which delimits with the upper side thereof the vehicle inner space and which can consequently be seen from the outer side. Also considered to belong to the shelf are the mentioned securing means which are provided for cooperation with the vessel member and the securing devices thereof. These may be, for example, threaded holes at the lower side of the shelf which either are directly formed in the planar portion of the shelf or, instead, are provided in additional components which are provided for this purpose, such as, for example, securing members, such as securing dome-like members, which are connected below the shelf by means of an adhesive connection or a weld connection.

The securing device on the vessel member also preferably has holes which form apertures in the wall of the vessel member. In order to connect the vessel member to the shelf, there may consequently be provision, for example, for screws or rivets to extend through the holes of the vessel member and to extend into holes or threads at the lower side of the shelf.

The vessel member itself preferably comprises for the most part plastics material. A composition of glass fiber and plastics material, in particular polypropylene, is particularly advantageous since this material combination has a low thermal expansion coefficient and good noise absorption properties. The vessel member may be produced in particular by means of stamping using a thermal forming process starting from a planar blank. It may also be advantageous for the vessel member to be constructed with several layers. A partial reinforcement of the vessel member, in particular in the region of the securing devices, may also be expedient.

For example, at the locations provided for securing, a securing sheet could be inserted into a layered composition of the vessel member.

In principle, it is conceivable for the vessel member to have relatively large apertures, which connect it to the surrounding space below the shelf. Such a vessel member would consequently be comparatively light. However, it is considered to be advantageous for the vessel member to have walls which, together with the shelf, largely close a vessel inner space, inside which the roller blind shaft is arranged, with respect to the environment. This closure relates to the connection between the vessel inner space and the environment below the shelf. It does not relate to the connection between the vessel inner space and the passenger space by means of the through-slot. Largely closing of the vessel inner space with respect to the environment is understood to be when a maximum of 10%, in particular preferably a maximum of 5%, of the boundary faces between the vessel inner space and the environment below the shelf is not delimited by walls of the vessel member. In particular, depending on the embodiment of the roller blind, it may be advantageous at the front ends of the vessel member to dispense with complete closure by means of the vessel member since this would make introduction of edge regions of the surface structure in guiding rails more difficult.

The largely closing of the vessel inner space with respect to the environment is advantageous not only with respect to the mechanical positional stability of the two shelf portions with respect to each other. In particular, it constitutes effective sound-damping. Sources of noise arranged in the environment of the vessel member can hardly be perceived any longer in the vehicle itself as a result of the closed vessel member.

Possible sources of noise which can be shielded by the vessel member include the electric motor and guiding pipes, inside which tension or pressure members move. It is therefore considered to be advantageous in this context for an electric motor for transferring the surface structure into the storage state or into the operating state and/or guiding pipes for guiding a member which can be moved by the electric motor to be arranged at least partially outside the vessel member. In contrast to what is provided in many known configurations, consequently, a noise insulation between the winding shaft and the through-slot, on the one hand, and the electric motor or the guiding pipes, on the other hand, is selectively proposed. As a result of the arrangement of the electric motor and/or the guiding pipes as noise sources outside the vessel member, they can no longer be heard inside the passenger compartment. However, in order to nonetheless provide an integral unit which is advantageous for assembly, it is considered to be advantageous for the electric motor and/or the guiding pipes to be secured at the outer side to the vessel member of the roller blind.

In principle, it is conceivable for the vessel member to have a cross section which does not change over the entire length thereof in the direction of the main axis. This allows simple production as an extruded profile-member. However, an embodiment in which a vessel inner space which is defined by the vessel member has a variable cross-sectional surface area with respect to the extent direction of the main axis is also advantageous. This is intended to be understood to mean that the vessel member, when viewed in the direction of the main axis, has expansions and/or contractions transversely relative to the main axis. This leads to increased inherent stability of the vessel member and consequently also to increased positional stability of the shelf portions with respect to each other. Instead of a member which is constructed in simplified terms in a two-dimensional manner, a member which is preferably shaped in a three-dimensional manner is consequently used as a vessel member.

It is advantageous in this instance for the vessel member to have a plurality of cross section expansions in which the cross-sectional surface area of the vessel inner space is at least 30% greater than in adjacent regions of the vessel inner space. Consequently, at least two such expansions are provided, the cross section of the vessel inner space being at least approximately 25% smaller than in the region of the cross section expansions at the outer side of the at least two expansions and/or between the two expansions. Preferably, the cross section expansions are even more clearly defined and have a cross-sectional surface area which is increased with respect to the minimum cross-sectional surface area of adjacent regions by 80%, preferably even by 120%.

This embodiment of the vessel member with cross section changes, in particular with local cross section expansions which are constructed in the manner of hollow ribs, leads to a high level of stability and in particular torsion resistance of the vessel member. The handling of the shelf with the fitted vessel member is thereby significantly improved.

An embodiment is particularly advantageous in which a large number of expansions are provided over the length in the direction of the main axis, in particular a number of at least four, preferably at least six, expansions.

As already mentioned in the introduction, the vessel member is connected both to the front and to the rear shelf portion. In this instance, it is particularly advantageous for there to be provided on the vessel member first and second securing devices for fitting to the front and rear shelf portions, respectively, the first and/or the second securing devices being offset with respect to each other in the plane of the extent of the shelf with respect to an orthogonal direction relative to the main axis. The term with respect to the preferred installation position of the roller blind system, in which the main axis extends in the transverse vehicle direction, is intended to be understood to mean that the first or the second securing device on the front and/or the rear shelf portion are arranged offset with respect to each other with respect to the longitudinal direction of the vehicle, respectively. The risk of the respective shelf portion becoming bent along this line as a result of securing devices which are arranged so as to be linear and parallel with respect to the main axis is thus prevented. Instead, the stability of the connection of the vessel member to the front or the rear shelf portion is significantly increased. With respect to the vessel member, such an arrangement of the securing devices is in particular possible by holes in the vessel member being spaced apart from the main axis to different extents with respect to an orthogonal direction relative to the main axis. The distance between the rearmost securing device in the longitudinal vehicle direction and the foremost securing device in the longitudinal vehicle direction for the same portion of the shelf is in this instance preferably at least 15 mm, in particular preferably at least 30 mm.

The invention further also relates to a vehicle having a roller blind system, the roller blind system being constructed in the abovementioned manner. The shelf of this roller blind system is preferably a parcel shelf which is arranged between a rear seat of the vehicle and a rear window.

In a development of such a vehicle according to the invention, there is provision for the vessel member to be connected to a bodywork of the vehicle, with the shelf portions being bypassed. Additional stabilization is thereby achieved. In this embodiment, the vessel member is connected not only to the two shelf portions, but also connected in a different manner at least indirectly to the bodywork, with these shelf portions being bypassed. In particular, there may be provided on a base of the vessel portion a securing device, for example, a securing hole, which enables the vessel member to be secured to a bodywork component which is arranged below the vessel member.

The invention further also relates to a production method for producing a roller blind system of the above-described type. In this instance, this production method is characterized by the specific feature that the vessel member is produced as a plastics component starting from a planar blank by means of a thermal forming process. This forming process may in particular be a stamping process, in which the heated blank is brought into the desired three-dimensional shape. This production method is, on the one hand, cost-effective. It is further advantageous since it enables the simple production of the three-dimensional shaping, which results in a high degree of stability. The selective influence of the properties of the vessel member by means of the use of a multi-layered blank or a blank of composite material is also possible.

Before or after the mentioned thermal forming process, securing holes are preferably formed as a securing device in the blank or the vessel member which has already been produced therefrom. This can be carried out in particular by means of punching.

BRIEF DESCRIPTION OF THE DRAWINGS

Other advantages and features of the invention will be appreciated from the claims and the following description of a preferred embodiment of the invention, which is explained with reference to the drawings, in which:

DETAILED DESCRIPTION OF THE EXEMPLARY EMBODIMENT

Figure 1:
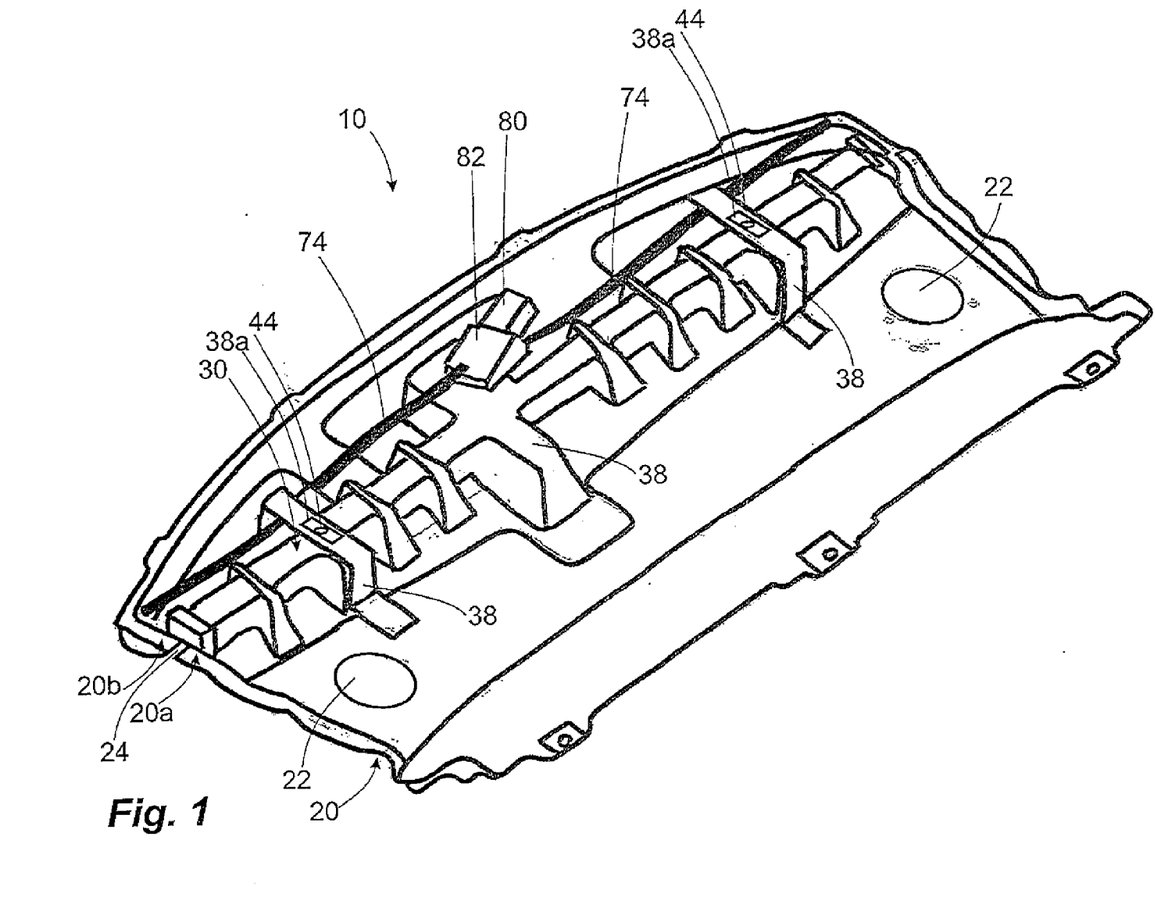
FIG. 1 is a view from below of a roller blind system according to the invention.

FIG. 1 shows an exemplary embodiment of a roller blind system according to the invention. This can be seen in FIG. 1 as a perspective view from below.

The roller blind system 10 has a substantially rigid shelf 20, which comprises two shelf portions 20a, 20b which are rigid per se and which are produced as separate components. They form by means of the upper side thereof which cannot be seen in FIG. 1 the parcel shelf of a vehicle, which is arranged behind the rear seats of the vehicle. They may further perform other functions. In the illustrated exemplary embodiment, for instance, the front shelf portion 20a is also the carrier of loudspeakers of an audio system and has to this end recesses 22 for loudspeakers.

The two shelf portions 20a, 20b are not directly connected to each other since the slot 24 provided therebetween acts as a through-slot for a flexible surface structure 54 of the roller blind system 10. Therefore, the connection of the two shelf portions 20a, 20b is instead carried out by means of a vessel member 30.

Figure 2:
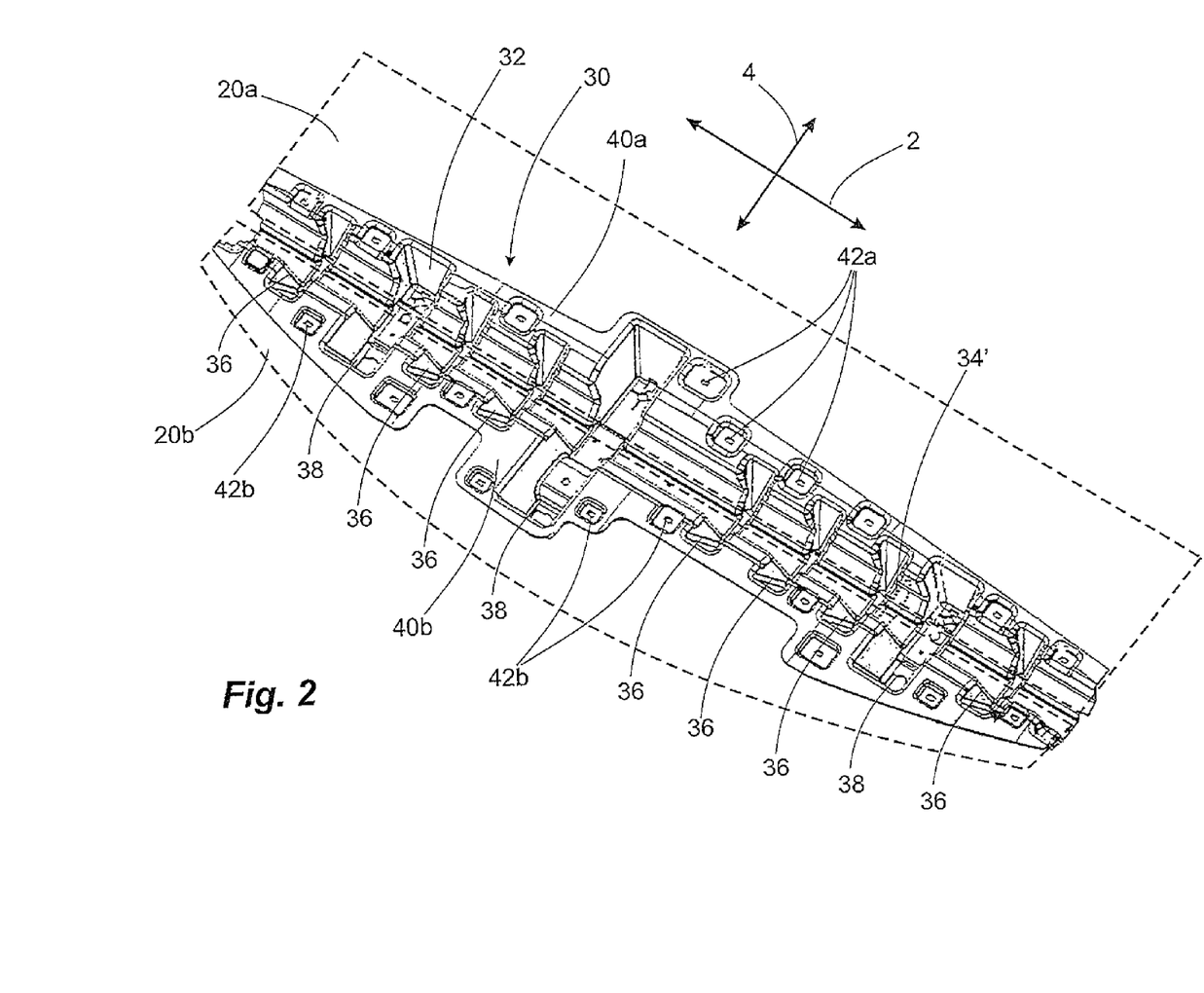
FIG. 2 is a view from above of the vessel member of the roller blind system of FIG. 1.

This vessel member 30 with shelf portions 20a, 20b which are indicated only in a dashed manner is illustrated as a perspective view from above in FIG. 2. The vessel member 30 forms an integral three-dimensional member which is upwardly open and which, as a result of its changing cross section in the direction of a main axis 2, which corresponds to the transverse vehicle direction, has a high degree of torsion resistance. The inner space 32 thereof has a uniform minimum cross section 34' over the entire length of the vessel member 30, an expansion of this cross section being provided partially over the length. There are thus provided a total of seven smaller ribs 36 with a slightly increased cross section and three large ribs 38 with a substantially increased cross section of the vessel inner space 32.

At the front side and the rear side of the recess which is open in an upward direction and which forms the vessel inner space 32, there are provided connection faces 40a, 40b which are in alignment with each other and which act as abutments on the shelf portions 20a, 20b. In the region of these connection faces 40a, 40b, a large number of holes 42a, 42b for connecting the vessel member 30 to the shelf 20 is provided. As can be seen clearly in FIG. 2, the positioning of the holes 42a or 42b with respect to a longitudinal vehicle direction 4 is different. It is thereby possible, after production of the connection between the shelf portions 20a, 20b and the vessel member 30 in the region of the holes 42a, 42b, for a bending along securing devices 42a, 42b which are in alignment with each other to be prevented. This alignment of all holes 42a or 42b does not exist in the embodiment illustrated.

Figure 3:
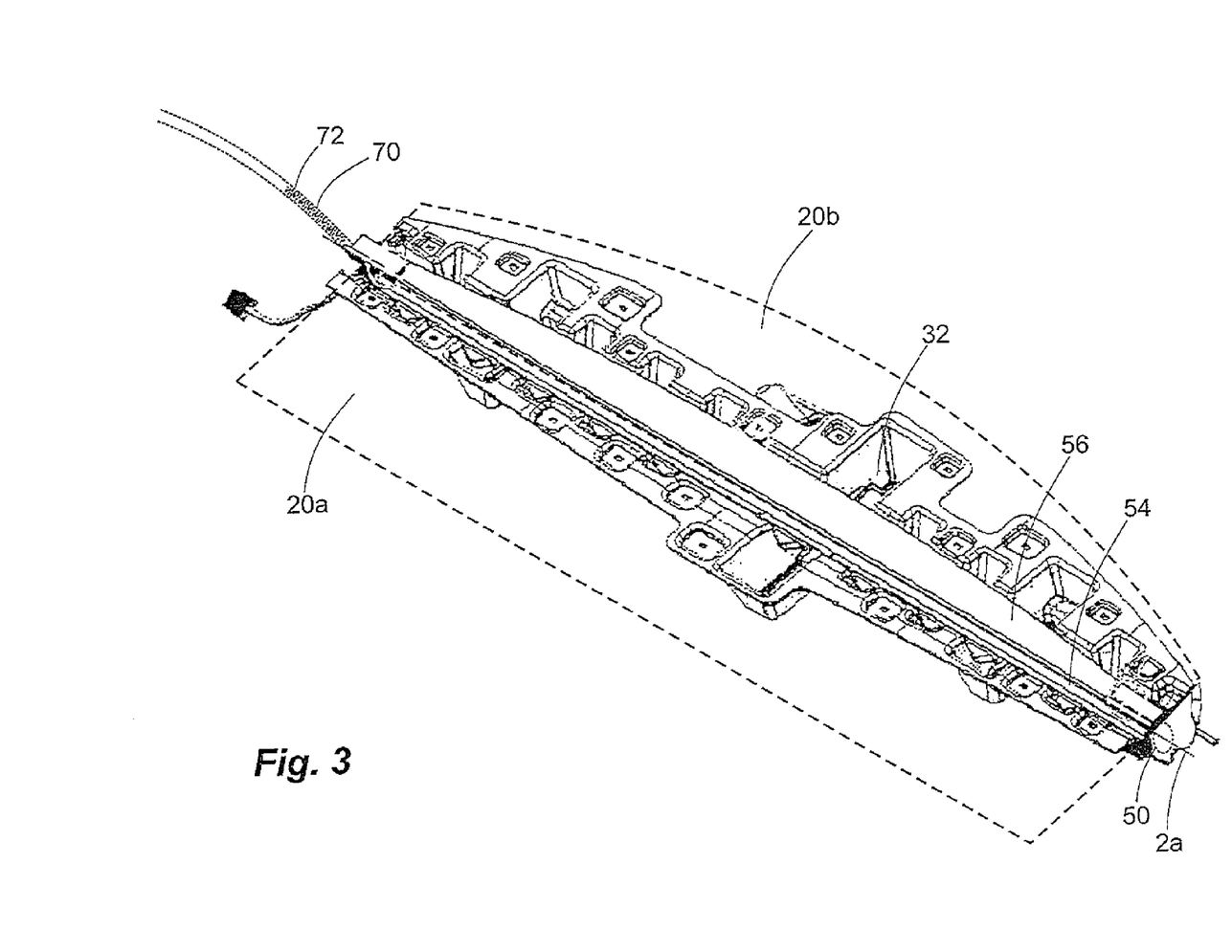
FIG. 3 shows the vessel member of FIG. 2, with roller blind components already inserted.

FIG. 3 again shows the vessel member 30, but now with components of the roller blind system 10 already incorporated in this vessel member. As in FIG. 2, the position of the shelf portions 20a, 20b can be seen drawn with dashed lines for clarity. In a state inserted into the vessel inner space 32 is a roller blind shaft 50, which is rotatably supported about a rotation axis 2a. To this end, at the open front ends of the vessel member 30, there are secured bearing blocks 52 which provide rotational support for the roller blind shaft 50. The flexible surface structure 54 is fitted to the roller blind shaft 50 with an end-side extension rod 56. The extension rod 56 is in this instance adapted to the through-slot 22 in such a manner that it cannot slide through it. Consequently, it always remains above the shelf 20. In a manner not shown in greater detail, there is provided inside the roller blind shaft 50 a winding spring which always applies force to the roller blind in the direction of the storage state thereof illustrated in FIG. 3. In order to move the surface structure 54 into the operating position thereof, there are provided at both sides of the winding shaft 50 guide rails 70, of which in FIG. 3 only one of the guide rails is partially illustrated by way of representation. The guide rails 70 directly adjoin the bearing blocks 52. They serve not only to guide lateral edges of the surface structure 54, but also to apply force to the surface structure 54 in the direction of the operating position thereof. To this end, there is provision for pushing members 72 which can be moved in a motorized manner to be guided within the guide rails 70. In FIG. 3, one of these pushing members 72 is illustrated for clarification, even if it could not normally be seen in practice in the illustrated storage position of FIG. 3.

As can be seen in FIG. 1, an electric motor 80 is provided in order to move these pushing members 72. Although this is part of the structural unit which also comprises the shelf 20 and the vessel member 30, it is arranged outside the vessel member below the rear shelf 20b. Guiding channels 74 for guiding the pushing members 72 which extend from a gear 82 which is connected to the electric motor 80 as far as the guide rails 70, are also provided outside the vessel inner space 32. Consequently, the feared production of noise in the guide channels 74 and on the electric motor 80 and the gear 82 cannot be perceived in the vehicle inner space. The largely closed vessel member 30 prevents this, optionally by means of a noise-absorbing layer which is provided especially for this purpose and as a result of the fact that it is generally produced from a sound-absorbing material.

Figure 4:
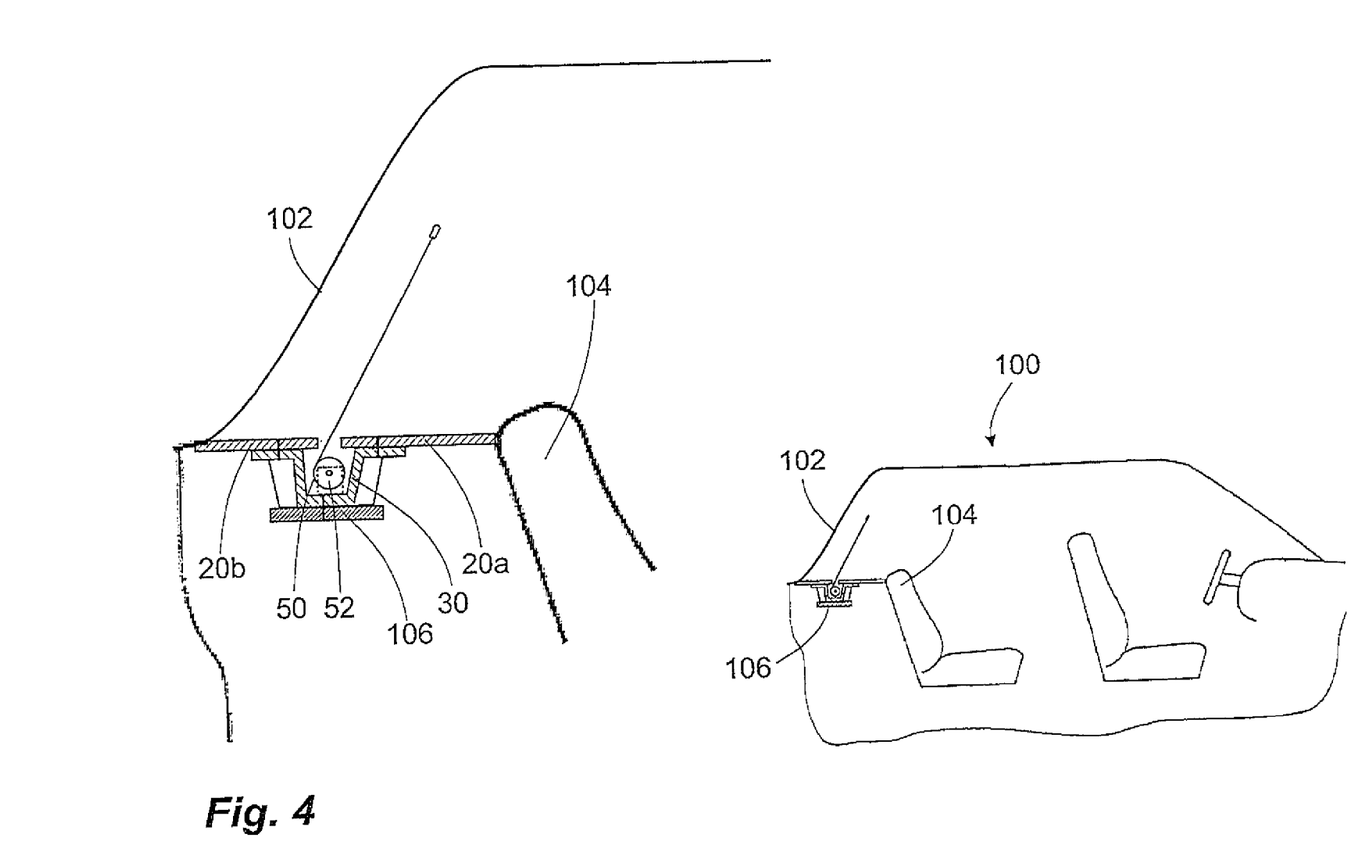
FIG. 4 shows the installation position of the roller blind system in a vehicle.

It can also be seen in FIG. 1 that two of the larger ribs 38 still perform an additional function. They are, in this instance by means of corresponding inserts and by means of apertures 38a which are provided in the region of the ribs 38, also securing locations 44 in order to be able to connect the vessel member 30 to a vehicle bodywork, bypassing the shelf 20. The stability of the parcel shelf can thereby be significantly improved. The securing locations 44 may in the most simple case again be holes through which the connection to the bodywork is carried out by means of screws or rivets. This is illustrated in FIG. 4.

With regard to the connection of the vessel member 30 to the shelf portions 20a, 20b, this is particularly advantageous when receiving holes which do not extend as far as the upper side of the shelf 20 are provided at the lower side of the shelf portions 20a, 20b for screws to be screwed in from below, so that this side which can be seen from the vehicle inner space is advantageous in aesthetic terms. In the present case, there are adhesively bonded from the lower side onto the support portions 20a, 20b dome-like members which each have an inner thread for receiving screws which are inserted through the connection faces 40a, 40b.

FIG. 4 again illustrates the arrangement in the vehicle. A vehicle 100 having a rear window 102 and a rear seat 104 can be seen in a stylized drawing. The roller blind system 10 is arranged below the rear window 102 and at the rear side of the rear seat 104. The shelf 20 forms a parcel shelf and is stabilized in the manner described by the vessel member 30. It can further be seen that the vessel member 30 is additionally secured to a transverse carrier 106 which belongs to the bodywork of the vehicle so that not only the securing of the parcel shelf 20 to surrounding bodywork components themselves but also the securing of the vessel member 30 contributes to the stability.

The invention claimed is:

1. A roller blind system for covering a rear window of a motor vehicle comprising:
   a roller blind, comprising a roller blind shaft which can be rotated about a main axis and a flexible surface structure which is wound on the roller blind shaft in a storage state and which is at least partially unwound from the roller blind shaft in an operating state; and
   a planar shelf which is intended to be arranged in a rear region of the motor vehicle and comprising a front shelf and a rear shelf each forming a part of the shelf, the front shelf and the rear shelf being separate and spaced from each other by a through-slot through which the surface structure is moved during transfer from the storage state into the operating state;
   wherein the front and rear shelves are connected to each other by a vessel member;
   wherein the roller blind shaft is arranged inside the vessel member and is rotatably supported by bearing blocks which are also secured to the vessel member or are an integral component of the vessel member;
   wherein a vessel inner space which is defined by the vessel member has a variable cross-sectional surface area with respect to an extent direction of the main axis; and
   wherein the vessel member has a plurality of cross section expansions in which the cross-sectional surface area of the vessel inner space is at least 30% greater than in adjacent regions of the vessel inner space.

2. The roller blind system as claimed in claim 1, wherein an electric motor for transferring the surface structure into the storage state or into the operating state is arranged at least partially outside the vessel member.

3. The roller blind system as claimed in claim 1, wherein, on the vessel member, first and second securing devices for securing to the front and rear shelves are provided, the first or the second securing devices being spaced apart from the main axis in a plane of a main extent of the shelf with respect to an orthogonal direction relative to the main axis by a different extent.

4. The roller blind system as claimed in claim 1, wherein the vessel member is constructed as a plastics member or as a multi-layered member comprising a plurality of layers, the layers comprising plastics material or the vessel member having been shaped by a thermal forming process starting from a planar blank.

5. A vehicle having a roller blind system, wherein the roller blind system is constructed in accordance with claim 1.

6. The vehicle as claimed in claim 5, wherein the vessel member is connected to a bodywork of the vehicle, with the shelves being bypassed.

7. A production method for producing the roller blind system as claimed in claim 1, wherein the vessel member of the roller blind system is produced as a plastics component starting from a planar blank by a thermal forming process.

8. The production method as claimed in claim 7, wherein before or after the thermal forming process, securing holes are formed in the blank or the vessel member.

9. A roller blind system for covering a rear window of a motor vehicle, the roller blind system comprising:
   a roller blind comprising a roller blind shaft rotatable about a main axis and a flexible surface structure wound on the roller blind shaft for movement between a storage state and an operating state, the flexible surface structure being at least partially unwound from the roller blind shaft in the operating state;
   a planar shelf arranged in a rear region of the motor vehicle, the planar shelf comprising a plurality of separate and non-integral parts, the plurality of separate and non-integral parts including a front shelf and a rear shelf, each of the front shelf and the rear shelf form part of the planar shelf, the front shelf being separate from the rear shelf, and the front shelf and the rear shelf being spaced from each other by a through-slot through which the surface structure is moved during transfer from the storage state into the operating state; and
   a vessel member connecting the front shelf to the rear shelf, the vessel member being connected to, but separate from and non-integral with, the front shelf and the rear shelf;
   the roller blind shaft being arranged inside the vessel member and rotatably supported by bearing blocks secured to or integral with the vessel member for allowing the roller blind shaft to rotate about the main axis;
   wherein the vessel member includes a vessel inner space, the vessel inner space having the roller blind shaft therein, the vessel inner space having a variable cross-sectional surface area with respect to an extent direction parallel to the main axis such that first wall sections of the vessel inner space at a first plane perpendicular to the extent direction are closer to the roller blind shaft than second wall sections of the vessel inner space at a second plane perpendicular to the extent direction; and wherein the vessel member has a plurality of cross section expansions in which the cross-sectional surface area of the vessel inner space is at least 30% greater than in adjacent regions of the vessel inner space.

10. The roller blind system as claimed in claim 9, further including an electric motor at least partially outside the vessel member for transferring the surface structure into the storage state or into the operating state.

11. The roller blind system as claimed in claim 9, wherein, on the vessel member, first and second securing devices for securing to the front and rear shelves are provided, the first and the second securing devices being spaced apart from the main axis in a plane of a main extent of the shelf with respect to an orthogonal direction relative to the main axis by a different extent.

\* \* \* \* \*